O. B. DUTTON.
FISHING TOOL.
APPLICATION FILED DEC. 28, 1920.
1,388,992.
Patented Aug. 30, 1921.
Fig. 1.
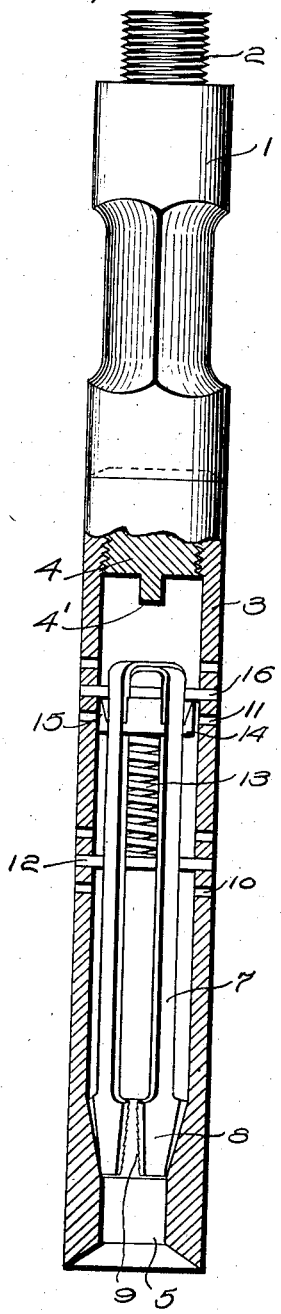
Fig. 2.
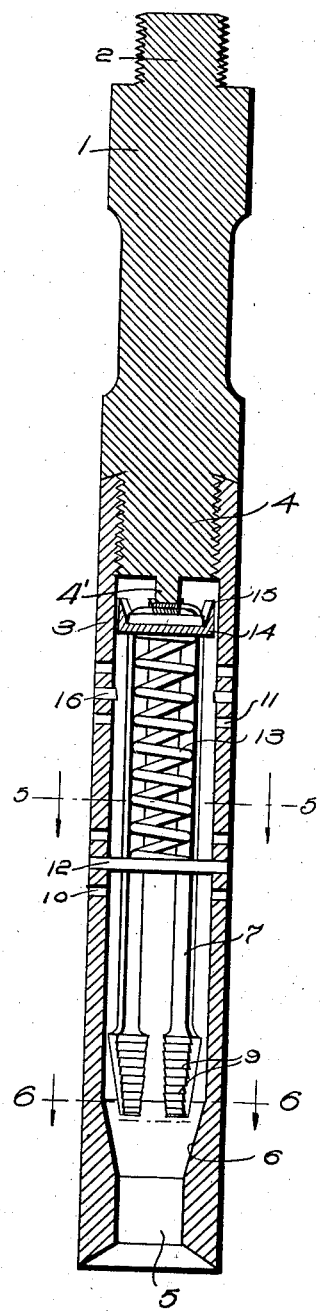
Fig. 3.
Fig. 4.
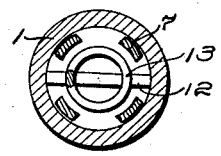
Fig. 5.
Fig. 6.
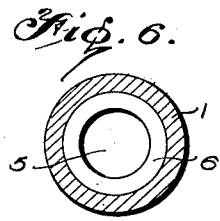
Inventor
OSCAR B. DUTTON
By
G. W. Earnshaw, Attorney

UNITED STATES PATENT OFFICE.

OSCAR B. DUTTON, OF BAXTER SPRINGS, KANSAS.

FISHING-TOOL.

1,388,992.   Specification of Letters Patent.   Patented Aug. 30, 1921.

Application filed December 28, 1920. Serial No. 433,646.

*To all whom it may concern:*

Be it known that I, OSCAR B. DUTTON, a citizen of the United States, residing at Baxter Springs, in the county of Cherokee and State of Kansas, have invented certain new and useful Improvements in Fishing-Tools, of which the following is a specification.

This invention relates to fishing tools, and it comprises a casing, gripping members slidably mounted in said casing, a spring arranged in said casing and adapted to hold said gripping members in inoperative position, a breakable pin or member limiting the action of said spring, a cutting member arranged on said spring and engaging said breakable member whereby said breakable member will be cut or severed when violent jarring occurs and the gripping members will assume an inoperative position.

In the use of fishing tools, the difficulty that has been constantly encountered is that when the slips or engaging jaws have gripped the lost tool in the well, there is no way to break the hold if the tool cannot be pulled out. Quite frequently, a portion of the lost tool will engage the sides of the well casing or other obstruction in such manner that pulling will cause it to become wedged and more difficult to remove. In such instances, it is necessary to break the hold on the tool, and at the present time, this can only be accomplished by jarring the fishing tool until it is broken or until the fishing tool is released from the rod and left in the well.

In the present invention, I have provided a fishing tool having slips or gripping jaws arranged to grip the lost tool and remove it from the well in which means are provided to release the lost tool if it becomes wedged in the side walls or cannot be removed for any other reason.

In the accompanying drawings, I have shown one embodiment of the invention. In this showing:

Figure 1 is a sectional view showing the slips in operative position,

Fig. 2 is a similar view showing the slips in inoperative position,

Fig. 3 is a plan view of the cutting member,

Fig. 4 is a central vertical sectional view thereof,

Fig. 5 is a horizontal sectional view on line 5—5 of Fig. 2, and,

Fig. 6 is a similar view on line 6—6 of Fig. 2.

Referring to the drawings, the reference numeral 1 designates a section of the fishing rod which is provided with a threaded extension 2 for the reception of another section, forming the rod by means of which the fishing tool is lowered into the well in the ordinary manner. The shell or casing 3 of the fishing tool is provided with internal screwthreads at its upper end, and is adapted to be screwed upon the lower end 4 of the fishing rod. The lower end of the rod is provided with a steel pin 4' to prevent injury of the cutting member.

The shell or casing is hollow and is provided with a restricted opening 5 at its lower end, the restricted opening communicating with the interior by means of a substantially conical portion 6. The gripping members 7 are slidably mounted within the casing and are provided with gripping jaws 8, at their lower end, the inner faces of which may be serrated, as at 9, to assist in gripping the lost tool. The casing is provided with two sets of openings 10 and 11. A steel pin 12 is adapted to be arranged in one of the lower openings 10. A coil spring 13 is arranged within the arms 7 of the gripping member and is supported by this pin. A blade 14 is arranged on the upper end of the spring, the blade being provided with upwardly projecting cutting members 15. A wooden pin 16 is arranged in one of the upper openings 11, the cutting members 15 being maintained in engagement therewith by the spring.

The operation of the device is as follows:

With the parts in the position shown in Fig. 1 of the drawings, the spring 13 is under tension and tends to move the cutting member 14 and the gripping members 7 upwardly. This upward movement is limited by the pin 16. The cutting members bear against the wooden pin, but do not engage it with sufficient force to sever it under ordinary conditions. When a lost tool is to be removed from a well, the fishing tool is lowered into position in the usual manner, and the tool is engaged by the jaws 8, the downward movement of the jaws through the conical portion 6 of the shell, forcing them into engagement with the lost tool. The fishing tool may then be lifted from the well and the lost tool recovered. When the lost tool is so firmly embedded or obstructed as to prevent upward movement of the fishing tool, with the lost tool attached, by reasonable upward jarring and it becomes necessary to break the hold of the gripping jaws 8 from the lost tool, a downward jar or drive on the fishing tool and associated parts, continued a short time, will force the cutting members 15 to sever the pin 16. When the pin 16 is severed, the coil spring 13 moves the cutting member and the slips or gripping elements upwardly, causing the gripping jaws to move upwardly into the large portion of the hollow casing or shell, and thus releasing the tool. The fishing tool may then be removed from the well without breaking it, or losing it, and a new pin inserted. The steel pin 4' engages the upper end of the gripping element and prevents the cutting edges 15 from contacting with the end of the rod and thus being damaged.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A fishing tool, comprising a shell or casing, gripping members slidably mounted therein, a spring engaging said gripping members and adapted to move them upwardly to an inoperative position, a pin extending across said casing to prevent upward movement of said gripping members, and means for severing said pin to permit said spring to move the gripping members to inoperative position.

2. A fishing tool comprising a shell or casing, gripping members slidably mounted therein, a coil spring engaging said gripping members and adapted to retain them in inoperative position, means for normally overcoming the action of said coil spring, and means for rendering said first mentioned means inoperative.

3. A fishing tool comprising a shell or casing, gripping members slidably mounted therein, said gripping members being so arranged that they will grip a tool when in extended position, but are rendered inoperative when in retracted position, a coil spring arranged in said casing and adapted to retain said gripping members in inoperative position, a pin arranged across said casing adapted to normally overcome the action of said spring, and means for removing said pin to permit said spring to retract the gripping members.

4. A fishing tool comprising a shell or casing, gripping members slidably mounted therein, the lower end of said shell or casing being provided with a restricted opening to cause said gripping members to engage a tool, said gripping members being inoperative when in retracted position within said casing, a coil spring arranged in said casing and adapted to retain said gripping members in inoperative position, a breakable pin arranged in said casing and normally maintaining said coil spring under tension and said jaws in operative position, and a cutting member arranged between said spring and said pin whereby said pin may be severed to permit retraction of said gripping members.

In testimony whereof I affix my signature in presence of two witnesses.

OSCAR B. DUTTON.

Witnesses:
JOSEPHINE CLOVER,
S. H. BOGLAN.